(12) United States Patent
Takaira

(10) Patent No.: US 10,948,756 B2
(45) Date of Patent: Mar. 16, 2021

(54) BACKLIGHT AND DISPLAY APPARATUS

(71) Applicant: Mitsubishi Electric Corporation, Tokyo (JP)

(72) Inventor: Kazutada Takaira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/682,236

(22) Filed: Nov. 13, 2019

(65) Prior Publication Data

US 2020/0201107 A1    Jun. 25, 2020

(30) Foreign Application Priority Data

Dec. 20, 2018  (JP) .............................. JP2018-237999

(51) Int. Cl.
G02F 1/1333       (2006.01)
F21V 8/00         (2006.01)

(52) U.S. Cl.
CPC ..... *G02F 1/133308* (2013.01); *G02B 6/0088* (2013.01); *G02B 6/0055* (2013.01); *G02B 6/0065* (2013.01); *G02F 2001/13332* (2013.01); *G02F 2001/133314* (2013.01); *G02F 2001/133317* (2013.01); *G02F 2202/28* (2013.01)

(58) Field of Classification Search
CPC .. G02B 6/0065; G02B 6/0085; G02B 6/0086; G02B 6/0088; G02B 6/0093; G02F 2202/28
See application file for complete search history.

(56) References Cited

U.S. PATENT DOCUMENTS

| | | | |
|---|---|---|---|
| 2007/0109461 A1* | 5/2007 | Park ................... | G02F 1/133606 349/58 |
| 2010/0066938 A1* | 3/2010 | Lee ...................... | G02B 6/0088 349/58 |
| 2010/0171900 A1* | 7/2010 | Lee ...................... | G02B 6/0051 349/58 |
| 2012/0206680 A1* | 8/2012 | Onishi .................. | G02B 6/005 349/122 |
| 2012/0236237 A1 | 9/2012 | Kanari et al. | |
| 2013/0208510 A1* | 8/2013 | Takashima ............. | G09F 13/04 362/615 |
| 2013/0215644 A1 | 8/2013 | Takada et al. | |
| 2013/0242609 A1* | 9/2013 | Mori .................... | G02B 6/0088 362/611 |
| 2016/0349567 A1* | 12/2016 | Kwon ............... | G02F 1/133308 |

(Continued)

FOREIGN PATENT DOCUMENTS

| | | |
|---|---|---|
| JP | 2006107824 A | 4/2006 |
| JP | 2011103221 A | 5/2011 |
| JP | 2013171723 A | 9/2013 |

*Primary Examiner* — Alexander K Garlen
(74) *Attorney, Agent, or Firm* — Studebaker & Brackett PC

(57) ABSTRACT

A backlight includes a light guide plate, an optical member, a frame, and an adhesive agent. The optical member is disposed to face the light guide plate. The optical member has a sheet-like shape. The frame is configured to enclose the light guide plate and the optical member. The adhesive agent is disposed in a first hole of the frame and in a space which communicates with the first hole and includes a cutout or a hole of each of the light guide plate and the optical member. The adhesive agent is configured to fix the light guide plate and the optical member.

7 Claims, 8 Drawing Sheets

(56) References Cited

U.S. PATENT DOCUMENTS

2017/0248808 A1* 8/2017 Hsu .................... G02B 6/0088
2018/0059479 A1* 3/2018 Ogura ................ G02B 6/0093
2018/0081392 A1* 3/2018 Kweon ............... G02B 6/0088
2018/0120498 A1* 5/2018 Tanaka ............... G02B 6/0056

* cited by examiner

F I G. 9
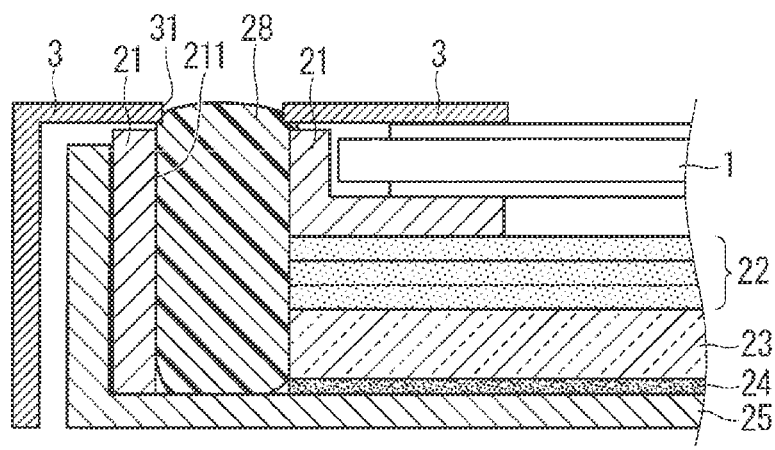
F I G. 10
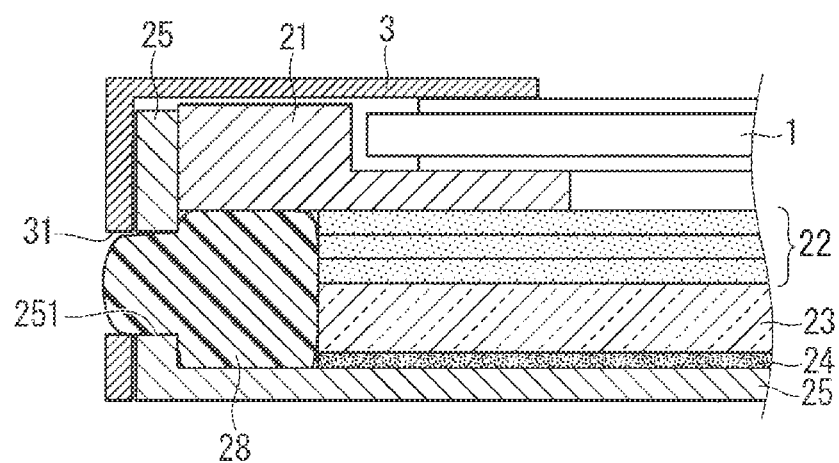

BACKLIGHT AND DISPLAY APPARATUS

BACKGROUND OF THE INVENTION

Field of the Invention

The present invention relates to a backlight, and a display apparatus including the backlight.

Description of the Background Art

A backlight in which a middle frame and a rear frame are fitted together in a state in which optical sheets, a light guide plate, and a reflection plate are accommodated in the rear frame has been known. Also, a display apparatus including the backlight, a display panel, and a front frame has been known. The following problems have hitherto been present. When the display apparatus as described above is vibrated, internal members of the backlight such as the optical sheets move with respect to external members of the backlight such as the frames, generating sound due to contact of the members, and causing damage to the members.

To solve the problems as described above, for example, in the related technologies such as Japanese Patent Application Laid-Open No. 2011-103221 and Japanese Patent Application Laid-Open No. 2013-171723, optical sheets, a light guide plate, and a reflection sheet are fixed by double-sided adhesive tapes, and movement of internal members is thereby restricted.

However, the configuration in Which many double-sided adhesive tapes are used as in the related display apparatus has problems of increase in the costs of the tape itself, as well as the manufacturing costs due to attachment operation.

SUMMARY

The present invention has been made in view of the problems as described above, and has an object to provide a technology that can fix a light guide plate and an optical member inside a backlight, with reduced use of tapes.

The present invention is intended for a backlight. The backlight includes a light guide plate, an optical member, and a frame. The optical member is disposed to face the light guide plate. The optical member has a sheet-like shape. The frame is configured to enclose the light guide plate and the optical member. A first hole is provided to pass through the frame in a direction in which the light guide plate and the optical member face each other. A cutout or a hole aligned to a position of the first hole of the frame is provided in each of the light guide plate and the optical member. The backlight further includes an adhesive agent. The adhesive agent is disposed in the first hole of the frame and in a space which communicates with the first hole and includes the cutout or the hole of each of the light guide plate and the optical member. The adhesive agent is configured to fix the light guide plate and the optical member.

The light guide plate and the optical member inside the backlight can be fixed, with reduced use of tapes.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a cross-sectional view illustrating a configuration of a part of the display apparatus according to the second embodiment.

FIG. 10 is a cross-sectional view illustrating a configuration of a part of the display apparatus according to a third modification of the first and second embodiments.

DESCRIPTION OF THE PREFERRED EMBODIMENTS

First Embodiment

Overall Configuration of Display Apparatus

Figure 1:
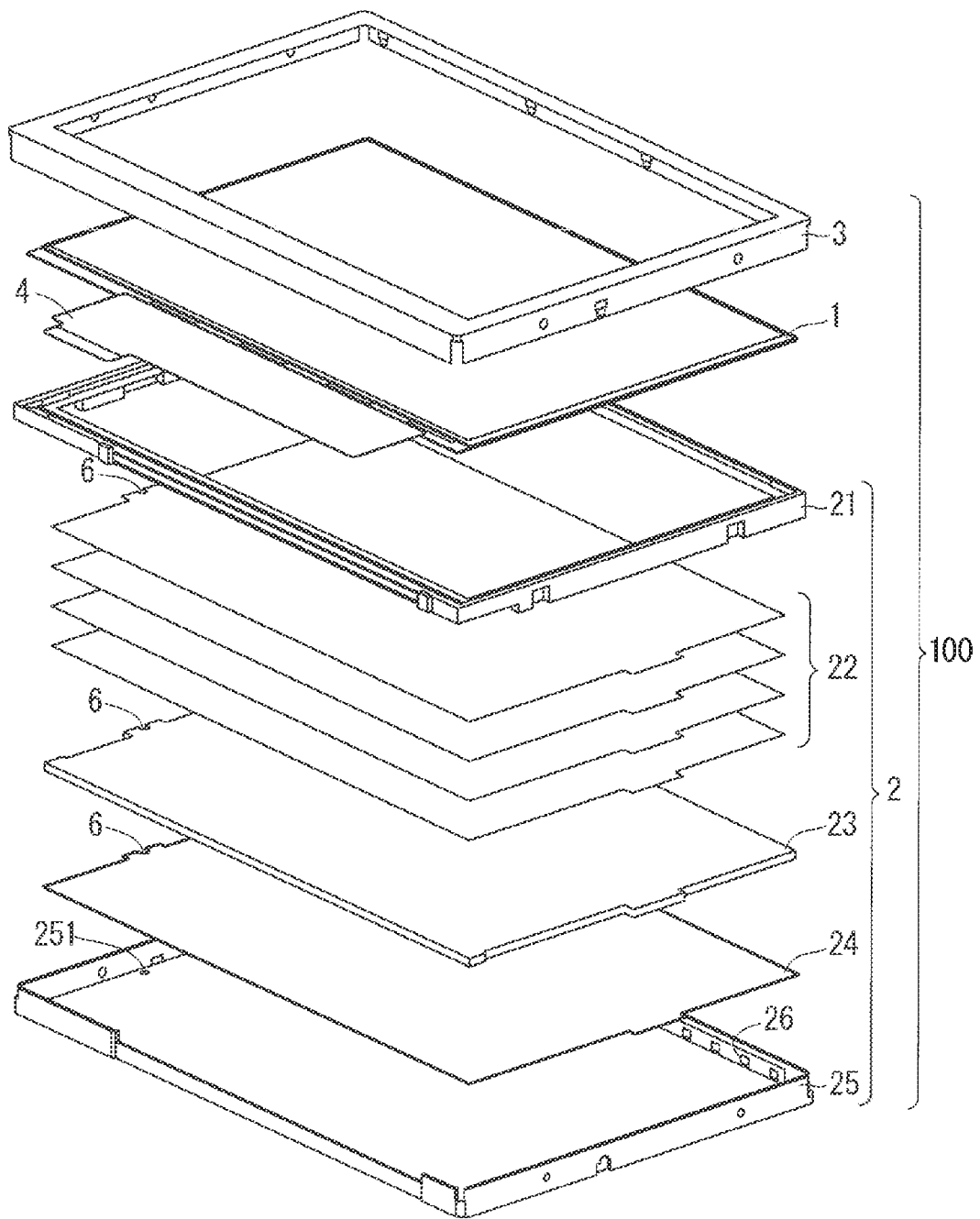
FIG. 1 is an exploded perspective view illustrating a configuration of a display apparatus according to a first embodiment.

FIG. 1 is an exploded perspective view illustrating a display apparatus 100 according to a first embodiment of the present invention. The display apparatus 100 of FIG. 1 includes a display panel 1, a backlight 2, a front frame 3, and a circuit substrate 4.

The display panel 1 is disposed to face the backlight 2. The backlight 2 irradiates a back surface of the display panel 1 with light. The front frame 3 covers at least a part of a frame (described later) of the backlight 2, in a state in Which the front frame 3 and the backlight 2 interpose the display panel 1. The front frame 3 includes an opening portion on an emission surface of light of the backlight 2. The circuit substrate 4 controls the display panel 1 and the light source 26, for example, with electric signals.

Note that, although illustration is omitted, a touch panel for detecting a touch position of touch operation on a screen, and a substantially transparent protective member for protecting the touch panel may be provided on a front surface of the display panel 1. Further, a cover for protecting the circuit substrate ay be provided on a back surface of the display panel 1.

Next, components of the display apparatus 100 according to the first embodiment will be described in detail.

Display Panel

Figure 2:
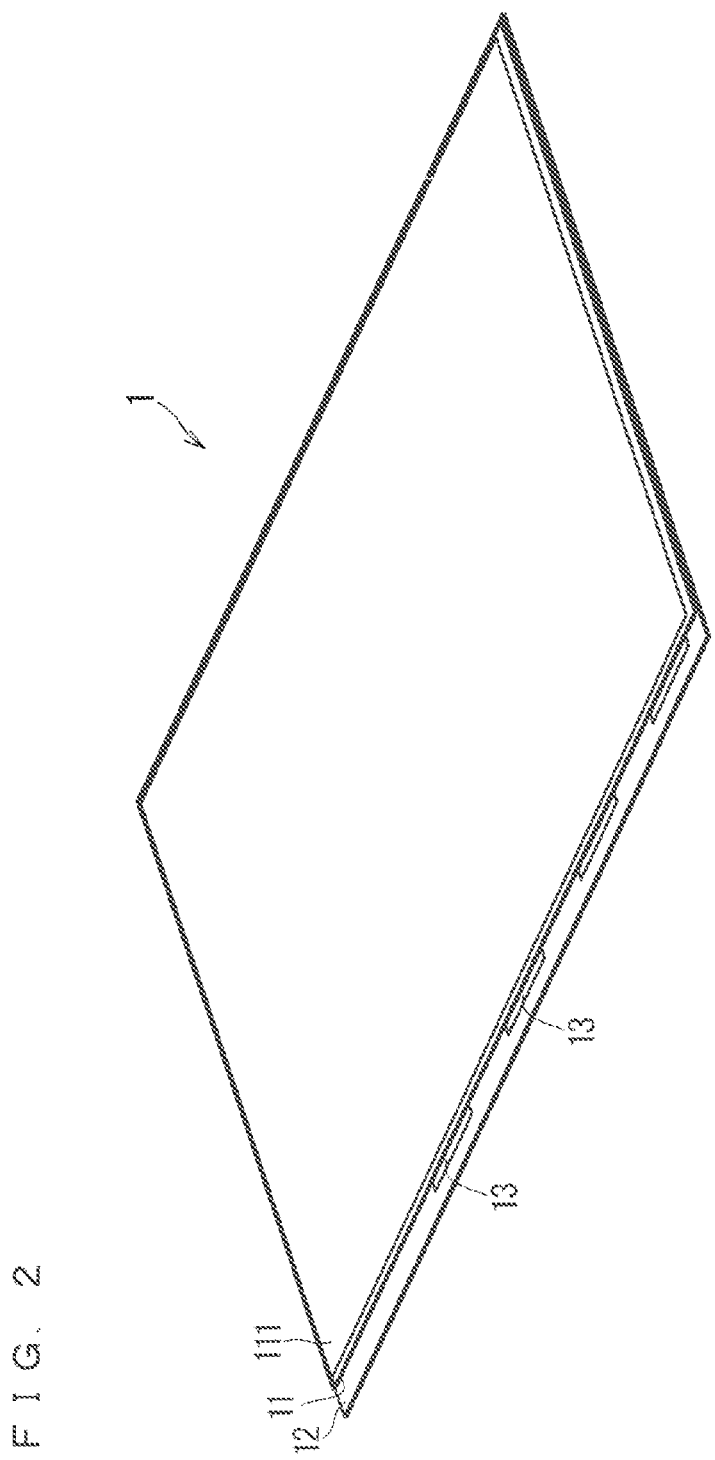
FIG. 2 is a perspective view illustrating a configuration of a display panel according to the first embodiment.

FIG. 2 is a perspective view illustrating a configuration of the display panel 1. For example, the display panel 1 is a transmission-type or a semi-transmission-type liquid crystal display panel utilizing birefringence of liquid crystals. The display panel 1 of FIG. 2 includes a first substrate 11 and a second substrate 12. Although illustration is omitted, the first substrate 11 includes an insulated substrate such as glass, a color filter (CF), a light blocking layer, and a counter electrode. The CF, the light blocking lay and the counter electrode are disposed on the insulated substrate. Although illustration is omitted, the second substrate 12 includes an insulated substrate such as glass, a thin film transistor (TFT) serving as a switching element, and a pixel electrode. The TFT and the pixel electrode are disposed on the insulated substrate.

Although illustration is omitted, the display panel 1 further includes spacers for maintaining an interval between the first substrate 11 and the second substrate 12, a sealing agent for attaching together the first substrate 11 and the second substrate 12, liquid crystals held between the first substrate 11 the second substrate 12, a sealing agent for an injection opening through which the liquid crystals are injected, and an alignment film for aligning the liquid crystals. The display panel 1 further includes a first polarizing plate 111 disposed on an outer side surface of the first substrate 11, a second polarizing plate (not shown) disposed on an outer side surface of the second substrate 12, and a drive integrated circuit (IC) 13. The drive IC 13 is disposed on an outer peripheral portion of the second substrate 12, or is disposed on a tape-like wiring material, such as a tape carrier package (TCP) and a chip on film (COF), that is connected to an outer peripheral portion of the second substrate 12.

Backlight

The backlight 2 emits light from the second substrate 12 side, which faces a side opposite to a display surface (front surface) of the display panel 1. The backlight 2 of FIG. 1 includes a light source 26, a light guide plate 23, sheet-like optical members, frames, and an adhesive agent 28.

The light source 26 emits light. The light guide plate 23 includes a side surface being an incident surface through which light emitted from the light source 26 enters, a front surface being an emission surface through which light that has entered through the incident surface and propagated is emitted, and a back surface being a counter emission surface.

The optical members of the backlight 2 are disposed to face the light guide plate 23. The optical members according to the first embodiment include optical sheets 22 disposed to face the emission surface of the light guide plate 23, and a reflection plate 24 disposed to face the counter emission surface of the light guide plate 23. The optical sheets 22 control distribution and diffusion of light emitted from the light guide plate 23. The reflection plate 24 reflects light emitted front the light guide plate 23 to cause the light to enter the light guide plate 23.

The frames of the backlight 2 enclose the light guide plate 23, the optical sheets 22, and the reflection plate 24. The frames according to the first embodiment de a middle frame 21 and a rear frame 25. The rear frame 25 covers a surface of the light guide plate 23 on the opposite side of an emission surface, i.e., the counter emission surface, and holds the light guide plate 23, the optical sheets 22, and the reflection plate 24, for example. The middle frame 21 covers an end portion of the emission surface of the light guide plate 23, and holds the light guide plate 23, the optical sheets 22, and the reflection plate 24, for example.

Light Guide Plate

The light guide plate 23 is made of transparent acrylic resin, polycarbonate resin, or glass, for example. At least any of the counter emission surface and the emission surface of the light guide plate 23 is provided with at least any of a scattering dot pattern and a prism shape for causing light to be emitted and for adjusting intensity distribution and an emission direction of in-plane light.

Optical Sheet

On the light guide plate 23, the optical sheets 22 for adjusting intensity distribution and an emission angle of emission light of the light guide plate 23 are disposed. As the optical sheets 22, for example, a necessary number of sheets of a type depending on purposes are used, out of a lens sheet intended for the purpose of concentrating light, a diffusion sheet intended for the purpose of making light uniform, and a viewing angle-adjustable sheet for adjusting luminance in a viewing angle direction. As the material for the optical sheets 22, for example, a resin material such as polycarbonate (PC) and poly ethylene terephthalate (PET) is used.

Middle Frame

The Middle frame 21 includes an opening portion for causing light from the emission surface of the light guide plate 23 to be emitted to the outside of the backlight 2. A projecting portion is provided on a front surface near the opening portion of the middle frame 21. The display panel 1 is mounted and held on the front surface of the middle frame 21 in a state in which the display panel 1 is positioned by the projecting portion. As the material for the middle frame 21, for example, metal such as aluminum, stainless steel, and iron, or a resin material such as polycarbonate (PC) and acrylonitrile butadiene styrene (ABS) is used.

Reflection Plate

The reflection plate 24 for reflecting light emitted from the counter emission surface of the light guide plate 23 toward the emission surface side is disposed below the light guide plate 23. As the material for the reflection plate 24, for example, a resin material such as poly ethylene terephthalate (PET) is used.

Rear Frame

It is desirable that metal having high thermal conductivity be used as the material for the rear frame 25, so that heat released from the light source 26 can be conducted and efficiently dissipated to the outside. Particularly, if a housing made of an aluminum or aluminum alloy having high thermal conductivity is used for the rear frame 25, heat from the light source 26 can be efficiently dissipated, and heat can be less liable to remain in the backlight 2.

The middle frame 21 and the rear frame 25 are generally fixed to each other with a hook catching structure or screw fastening, and thereby holds other components of the backlight 2, the display panel 1, and the circuit substrate 4, for example. Note that, as the middle frame 21 and the rear frame 25, a single member integrating both the frames may be used, instead of separate members individually prepared for these frames.

Light Source

As the light source 26, for example, point light sources such as light emitting diodes (LEDs) of three primary colors of light including red, green, and blue (RGB), point light sources of emitting colors other than RGB, or fluorescent lamps are used. In the configuration in which point light sources are used as the light source 26, a light source substrate on which the point light sources are mounted may include a general glass epoxy resin as a base, or may include a flexible flat cable. Alternatively, to enhance heat dissipation performance, the light source substrate may include metal such as aluminum or ceramics as a base. The light source substrate is held by being attached to a side surface of the light guide plate 23, or an inner side surface of the rear frame 25, for example.

Front Frame

The front frame 3 is a frame-like member that holds the display panel 1 and the backlight 2. For example, the front frame 3 is made of a thin plate-like metal molded product or resin molded product, and is fixed to the backlight 2 with a hook-like fixing structure, screw fastening, or the like. The front frame 3 may be made of a single member, or may be made of a combination of a plurality of members. Further, an attachment portion (for example, a screw or an attachment hole) to be attached to the final product may be provided in a side surface, a front surface, a back surface, a peripheral portion, or the like of the front frame 3.

Circuit Substrate

The circuit substrate 4 controls the display panel 1 and the light source 26 with input and output signals being electric signals. Usually, electrical components of the circuit substrate 4 are mounted on a flexible printed circuit (FPC) that is connected to the display panel 1 and that has a configuration in which wiring is disposed on a base material of a film, but this is not restrictive. For example, the electrical components of the circuit substrate 4 may be mounted, disposed, and, fixed on a surface of a copper pattern joined to glass epoxy or the like by solder, mainly on a back surface side (side on which light of the backlight 2 is not emitted) of the display apparatus 100.

Further, to protect the circuit substrate 4 from external pressure and static electricity, the circuit substrate 4 may be covered by a protective cover (not shown) made of metal such as aluminum, stainless steel, a zinc-plated sheet steel, or a film-like thin resin made of polyethylene terephthalate (PET) or the like. In the configuration in which a metal protective cover is provided, it is desirable that a resin sheet made of PET or the like be attached to the circuit substrate 4, for the sake of securing insulation to avoid unintended electrical contact between the circuit substrate 4 and the electrical components on the circuit substrate 4 and the outside.

Cutout

Figure 3:
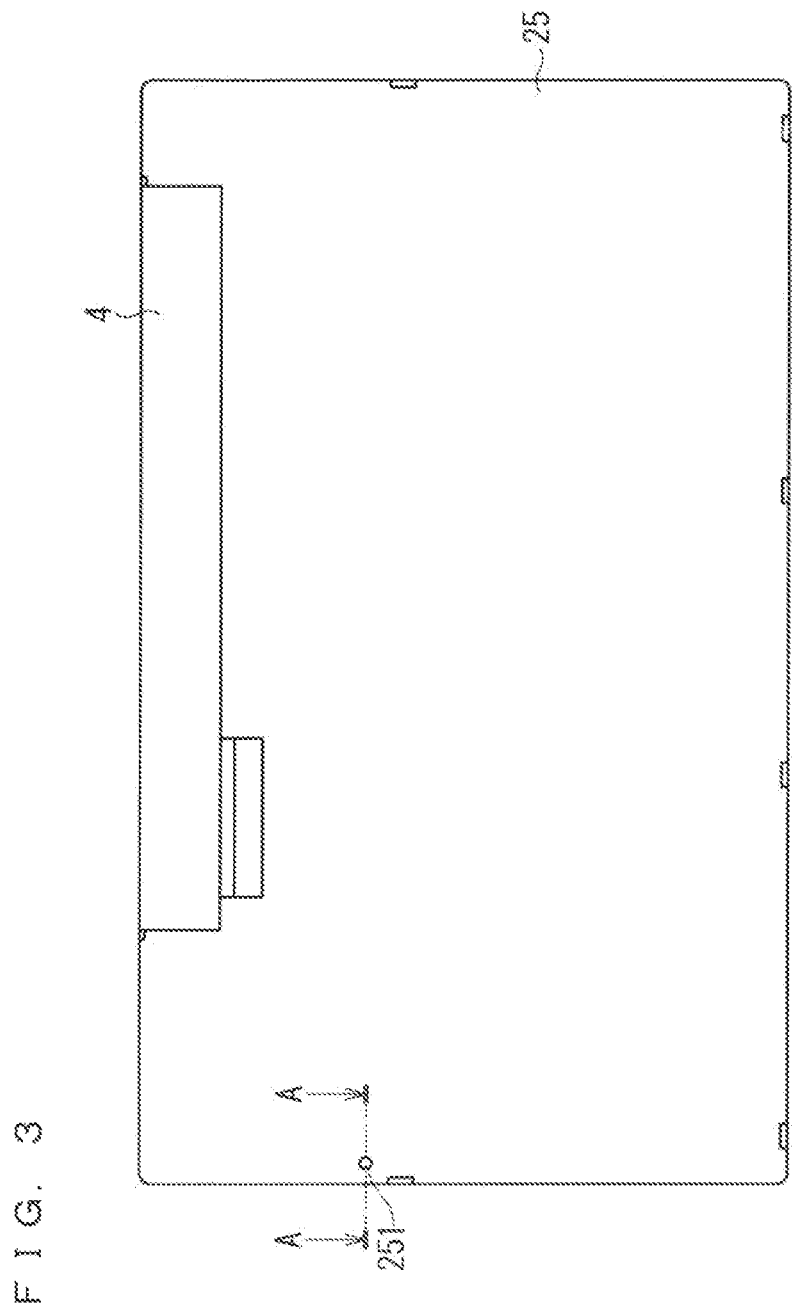
FIG. 3 is a plan view of a configuration of the display apparatus according to the first embodiment, as seen from a back surface.
Figure 4:
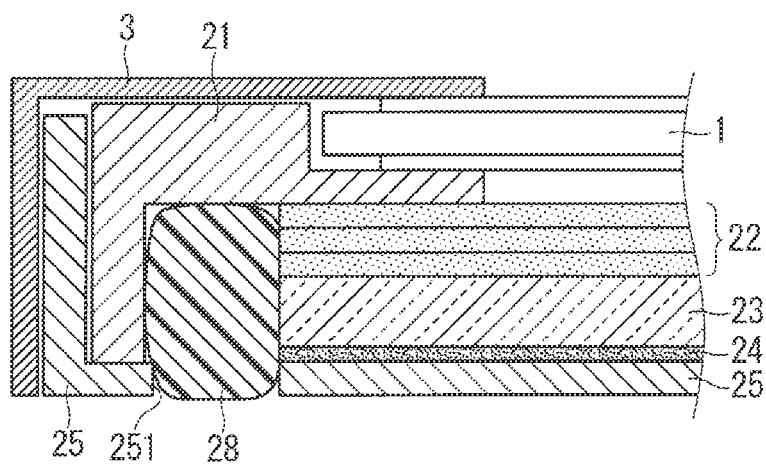
FIG. 4 is a cross-sectional view illustrating a configuration of a part of the display apparatus according to the first embodiment.
Figure 5:
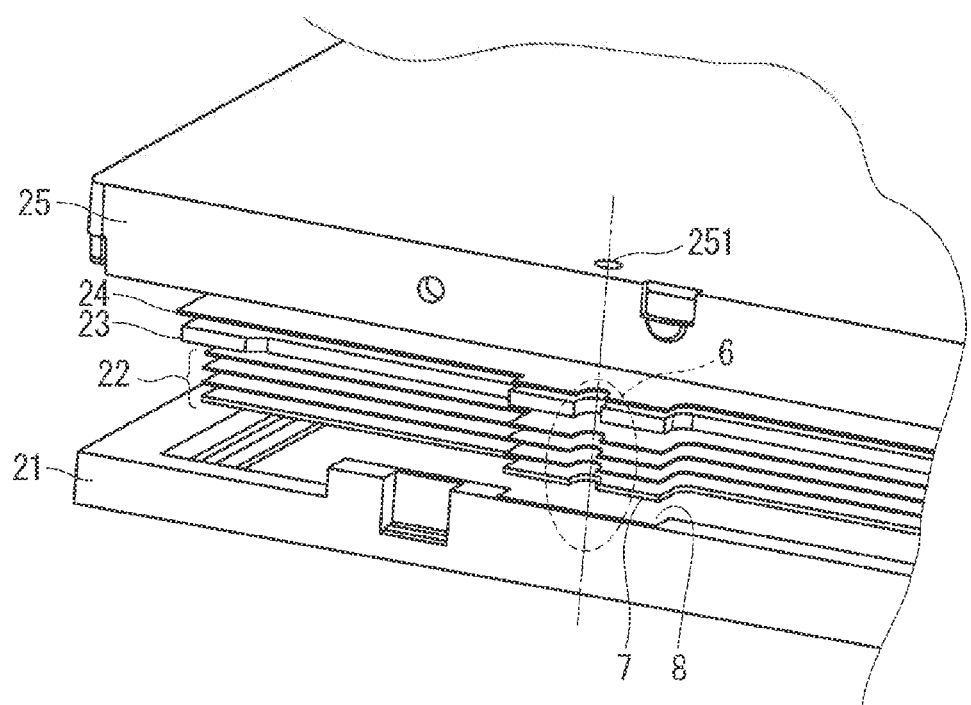
FIG. 5 is an exploded perspective view illustrating a configuration of a part of the display apparatus according to the first embodiment.

FIG. 3 is a plan view of a configuration of the display apparatus 100 according to the first embodiment, as seen from the back surface. FIG. 4 is a cross-sectional view taken along the cross-sectional line A-A of FIG. 3. FIG. 5 is an exploded perspective view illustrating a configuration near the cross-sectional line A-A of the display apparatus 100.

As illustrated in FIG. 3, in the first embodiment, at least one first hole 251 is provided in a surface of the rear frame 25 on an opposite side of the display surface side of the display apparatus 100. The first hole 251 passes through the rear frame 25 in a direction in which the light guide plate 23 and the optical sheets 22 and the reflection plate 24 face each other. It is desirable that the first hole 251 be provided in a portion that does not affect display of the display apparatus 100, for example, a portion outside of a display area of the display panel 1.

Figure 6:
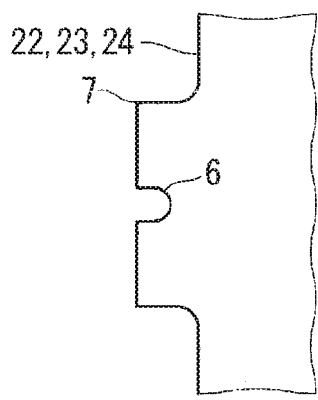
FIG. 6 is a plan view illustrating cutouts according to the first embodiment.

As illustrated in the exploded perspective view of FIG. 5, an end portion of each of the light guide plate 23, the optical sheets 22, and the reflection plate 24 includes a projecting portion 7 projecting toward a side and being fitted into a recessed portion 8 provided on an inner side surface of the middle frame 21. Further, the projecting portion 7 of each of the light guide plate 23, the optical sheets 22, and the reflection plate 24 is provided with a cutout 6. FIG. 6 is a plan view illustrating the cutout 6 provided in each of the light guide plate 23, the optical sheets 22, and the reflection plate 24. In the first embodiment, the cutout 6 of each of the light guide plate 23, the optical sheets 22, and the reflection plate 24 has the same shape, but may have slightly different shapes.

As illustrated in FIG. 4 and FIG. 5, the cutout 6 of each of the light guide plate 23, the optical sheets 22, and the reflection plate 24 is aligned to the position of the first hole 251 of the rear frame 25. In the first embodiment, the position of the center of the cutout 6 of each of the light guide plate 23, the optical sheets 22, and the reflection plate 24 is aligned to the position of the center of the first hole 251 of the rear frame 25, but may be slightly shifted as long as the space is maintained and the space communicates with the first hole 251. In this manner, the space that communicates the first hole 251 and includes the cutout 6 of each of the light guide plate 23, the optical sheets 22, and the reflection plate 24 can be provided inside the frame.

Note that it is desirable that the cutouts 6 be provided in a portion that does not affect display of the display apparatus 100, for example, a portion outside of the display area of the display panel 1, such as the projecting portion 7. Further, instead of the cutout 6, a circular hole similar to the first hole 251 of the rear frame 25 may be provided in each of the light wide plate 23, the optical sheets 22, and the reflection plate 24.

Adhesive Agent

As illustrated in FIG. 4, the adhesive agent 28 is injected and loaded into the space through, the first hole 251 of the rear frame 25, and is thereby filled in the first hole 251 and the space. The adhesive agent 28 configured as described above fixes the light guide plate 23, the optical sheets 22, and the reflection plate 24.

The adhesive agent 28 absorbs moisture in air, and gradually cures over time. As the adhesive agent 28, a thermosetting or UV-curable adhesive agent, a two-liquid mixing adhesive agent can be used, other than general adhesive agents. Thus, an adhesive agent to be used as the adhesive agent 28 may be appropriately selected depending on characteristics required for the display apparatus 100.

Note that it is desirable that an adhesive agent having viscosity of 50000 mPa·sec or more and 300000 mPa·sec or less be used as the adhesive agent 28, so that the injected adhesive agent 28 does not enter an unintended gap between members of the display apparatus 100. In the first embodiment, by providing the cutouts 6 in the projecting portion 7 that can be fitted into the recessed portion 8 of the middle frame 21 as in FIG. 5, the adhesive agent 28 can be arranged not to enter an unintended gap between members of the display apparatus 100.

With the above configuration, the middle frame 21, the optical sheets 22, the light guide plate 23, the reflection plate 24, and the rear frame 25 are integrally fixed by the adhesive agent 28. In this manner, movement of each member is restricted by the adhesive agent 28. Accordingly, even if vibration is applied to the display apparatus 100, movement of the optical sheets 22, the light guide plate 23, and the reflection plate 24 in a plan direction is restricted. Thus, collision sound between these components and other members such as the rear frame 25 and the middle frame 21, and damage to these components can be less liable to be caused.

Overview of First Embodiment

According to the first embodiment as described above, the adhesive agent 28 is disposed in the first hole 251 of the rear frame 25 and in the space that communicates with the first hole 251 and includes the cutout 6 of each of the light guide plate 23, the optical sheets 22, and the reflection plate 24, and fixes the optical sheets 22 and the reflection plate 24. According to such a configuration, even if vibration is applied to the display apparatus 100, movement of internal members of the backlight 2 with respect to external members can be restricted. Further, such a configuration can be implemented by at least one injection of the adhesive agent 28 such as resin, not by using many double-sided tapes. Thus, costs can be reduced. Note that, with appropriate use of double-sided tapes, internal members can be more securely fixed.

First Modification

Figure 7:
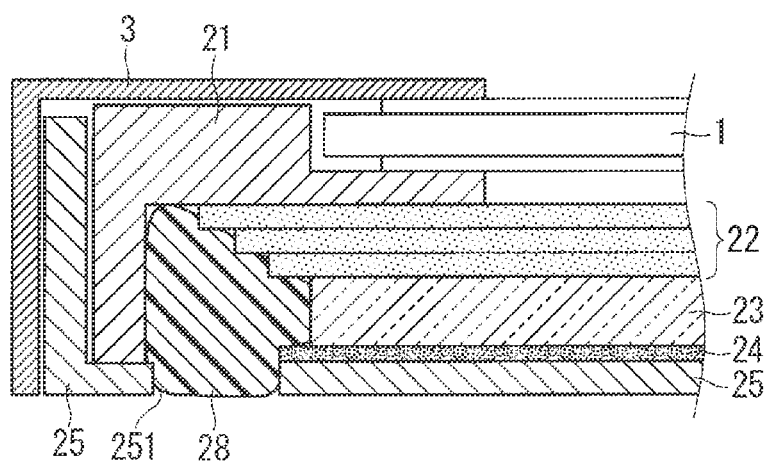
FIG. 7 is a cross-sectional view illustrating a configuration of a part of the display apparatus according to a first modification of the first embodiment.

FIG. 7 is a cross-sectional view illustrating a configuration of a part of the display apparatus 100 according to the first modification. In FIG. 7, a projection length of an end portion of the optical sheet 22 farthest from the light guide plate 23 from an end portion of the light guide plate 23 is larger than a projection length of an end portion of the optical sheet 22 closest to the light guide plate 23 from the end portion of the light guide plate 23. Further, an end portion of the reflection plate 24 projects from the end portion of the light guide plate 23. According to such a configuration, a contact area between the optical sheets 22 and the light guide plate 23 and the adhesive agent 28 is increased, and thus the adhesive agent 28 can securely fix the optical sheets 22 and the light guide plate 3. Note that the first modification can also be similarly applied to a second embodiment to be described later.

Second Modification

In the first embodiment, the cutouts 6 are provided in all of the optical sheets 22, the light guide plate 23, and the reflection plate 24, but this is not restrictive. For example, the cutouts 6 may be provided in the light guide plate 23 and the reflection plate 24 without providing the cutouts 6 in the optical sheets 22, and the light guide plate 23 and the reflection plate 24 may be fixed with the adhesive agent 28. Further, a plurality of first holes 251, instead of a single first hole 251, may be provided as long as the display area of the display panel 1 is not affected. Further, by providing a plurality of cutouts 6 corresponding to the plurality of first holes 251, a space in which the adhesive agent 28 is filled inside the frame may be increased. Note that the second modification can also be similarly applied to a second embodiment to be described later.

Second Embodiment

Figure 8:
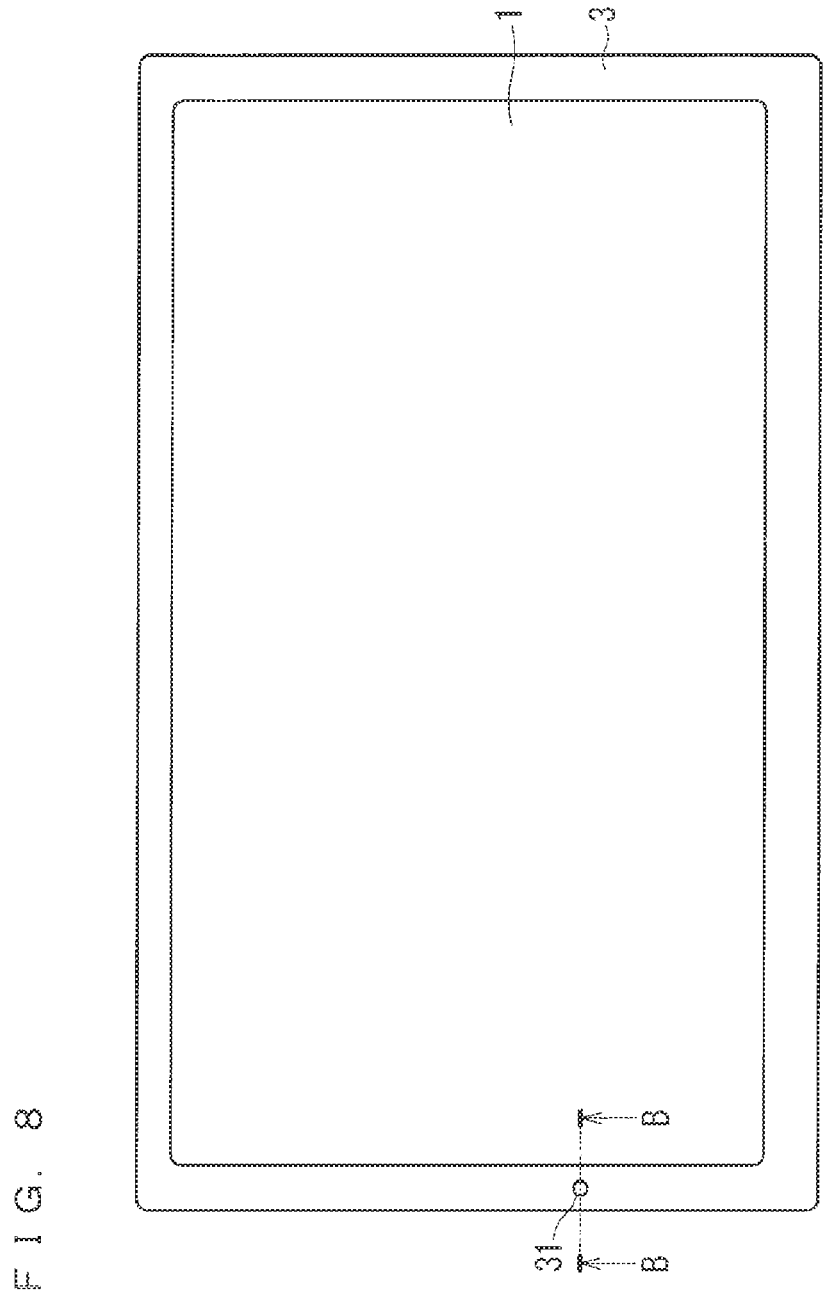
FIG. 8 is a plan view of a configuration of the display apparatus of a second embodiment, as seen from a back surface.

FIG. 8 is a plan view of a configuration of the display apparatus 100 according to a second embodiment of the present invention, as seen from the front surface. FIG. 9 is a cross-sectional view taken along the cross-sectional line B-B of FIG. 8. In the following, of the components according to the second embodiment, components that are the same as or similar to the above components are denoted by the same reference signs, and different components will be mainly described.

In the first embodiment, at least one first hole 251 is provided in the rear frame 25, the cutouts 6 being included by the space communicating with the first hole 251 are provided in the optical sheets 22, the light guide plate 23, and the reflection plate 24, and the adhesive agent 28 is injected and loaded into the space through the first hole 251.

In contrast, in the second embodiment, as illustrated in FIG. 9, instead of the first hole 251, at least one first hole 211 is provided in a front surface of the middle frame 21, and the cutouts 6 being included by a space communicating with the first hole 211 are provided in the optical sheets 22, the light guide plate 23, and the reflection plate 24. Further, as illustrated in FIG. 8 and FIG. 9, a second hole 31 communicating with the first hole 211 of the middle frame 21 is provided in the front frame 3. Further, as illustrated in FIG. 9, the adhesive agent 28 is injected and loaded into the first hole 211 and the space through the second hole 31 of the front frame 3, and is thereby filled in the first hole 211, the second hole 31, and the space. The adhesive agent 28 configured as described above fixes the light guide plate 23, the optical sheets 22, and the reflection plate 24.

Note that, if the adhesive agent 28 is transparent, light of the light source 26 may leak to the outside of the display apparatus 100 through the adhesive agent 28 inside the first hole 211 and the second hole 31. In this case, as illustrated in FIG. 8 and FIG. 9, in the configuration in which the second hole 31 is provided in the front surface of the display apparatus 100, a user may visually recognize the light leakage when the user observes display of the display apparatus 100. To reduce the leakage, the use of a black adhesive agent as the adhesive agent 28, or covering the second hole 31 with a light-blocking tape or the like is effective.

Overview of Second Embodiment

According to the second embodiment as described above, the adhesive agent 28 is disposed in the first hole 211 of the middle frame 21, the second hole 31 of the front frame 3, and the space including the cutout 6 of each of the light guide plate 23, the optical sheets 22, and the reflection plate 24, and collectively fixes internal members from the rear frame 25 to the front frame 3. According to such a configuration, even if vibration is applied to the display apparatus 100, movement of internal members of the display apparatus 100 with respect to external members can be restricted. Further, such a configuration can be implemented by at least one injection of the adhesive agent 28 such as resin, not by using many double-sided tapes. Thus, costs can be reduced. Note that, with appropriate use of double-sided tapes, internal members can be more securely fixed.

Third Modification

FIG. 10 is a cross-sectional view illustrating a configuration of a part of the display apparatus 100 according to the third modification. In the third modification, at least one first hole 251 is provided in a side surface of the rear frame 25. Further, a second hole 31 communicating with the first hole 251 of the rear frame 25 is provided in the front frame 3. Further, the adhesive agent 28 is injected and loaded into the space through the second hole 31 of the front frame 3, and is thereby filled in the first hole 251, the second hole 31, and the space. The adhesive agent 28 configured as described above fixes the light guide plate 23, the optical sheets 22, and the reflection plate 24. Thus, effects similar to those of the first and second embodiments can be obtained.

Note that, in the configuration of FIG. 10, another first hole (not shown) communicating with the first hole 251 of the rear frame 25 may be provided in the middle frame 21.

Fourth Modification

Figure 11:
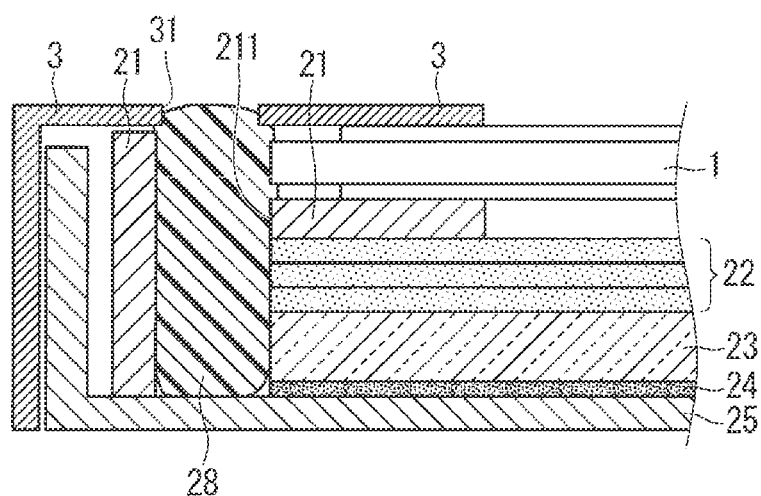
FIG. 11 is a cross-sectional view illustrating a configuration of a part of the display apparatus according to a fourth modification of the first and second embodiments.

FIG. 11 is a cross-sectional view illustrating a configuration of a part of the display apparatus 100 according to the fourth modification. A configuration of the fourth modification is the same as the configuration of the second embodiment (FIG. 9), except that the display panel 1 comes in contact with the adhesive agent 28. Specifically, in the fourth modification, the adhesive agent 28 fixes not only the light guide plate 23, the optical sheets 22, and the reflection plate 24, but also fixes the display panel 1. According to such a configuration, tapes or the like for fixing the middle frame 21 and the display panel 1 can be omitted. Note that the fourth modification can also be similarly applied to the first embodiment described above.

Fifth Modification

Figure 12:
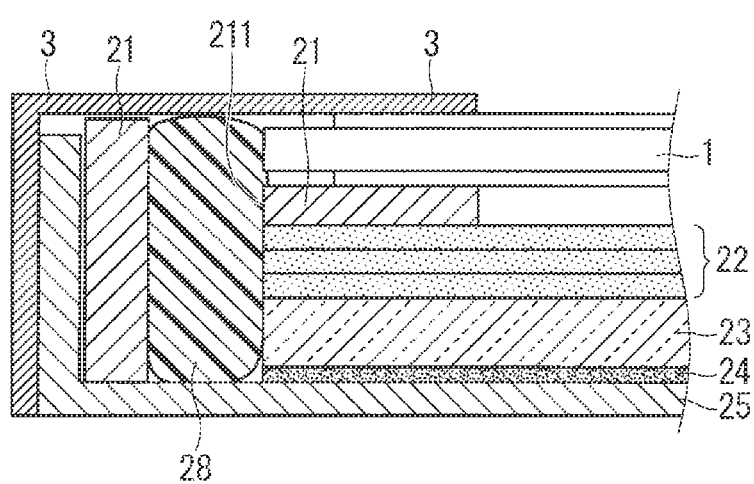
FIG. 12 is a cross-sectional view illustrating a configuration of a part of the display apparatus according to a fifth modification of the first and second embodiments.

FIG. 12 is a cross-sectional view illustrating a configuration of a part of the display apparatus 100 according to the fifth modification. A configuration of the fifth modification is the same as the configuration of the second embodiment (FIG. 9), except that the second hole 31 of the front frame 3 is not provided. Note that the configuration of FIG. 12 is manufactured by attaching the front frame 3 to the backlight 2 after the adhesive agent 28 is filled. According to such a configuration, even if the adhesive agent 28 is transparent, light of the light source 26 is less liable to leak to the outside of the display apparatus 100 through the adhesive agent 28 inside the first hole 211.

Note that, in the present invention, each embodiment can be freely combined with each other, and each embodiment can be modified or omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A backlight comprising:
a light guide plate having a first main surface being an emission surface and a second main surface that is opposite to the first main surface;
an optical member disposed to face the light guide plate, the optical member having a sheet-like shape; and
a frame configured to enclose the light guide plate and the optical member, the frame including
a rear frame provided on a side of the light guide plate corresponding to the second main surface,
a front frame provided on a side of the light guide plate corresponding to the first main surface, and
a middle frame provided between the rear frame and the front frame and disposed on a portion of the optical member, wherein
a first hole is provided to pass through the frame in a direction in which the light guide plate and the optical member face each other,
a cutout or a hole aligned to a position of the first hole of the frame is provided in each of the light guide plate and the optical member, and
the backlight further comprises an adhesive agent, the adhesive agent being disposed in the first hole of the frame and in a space which communicates with the first hole and includes the cutout or the hole of each of the light guide plate and the optical member, the adhesive agent being configured to fix the light guide plate and the optical member.

2. The backlight according to claim 1, wherein
the rear frame is configured to cover the second main surface of the light guide plate, and
the first hole of the frame is provided in at least one of the rear frame and the middle frame.

3. A display apparatus comprising:
the backlight according to claim 1; and
a display panel disposed to face the backlight.

4. The display apparatus according to claim 3, wherein
the front frame is configured to cover at least a part of the rear frame and middle frame of the backlight, in a state in which the display panel is interposed between the front frame and the backlight,
a second hole is provided in the front frame to communicate with the first hole, and
the adhesive agent is also disposed in the second hole of the front frame.

5. The display apparatus according to claim 3, wherein
the adhesive agent fixes not only the light guide plate and the optical member, but also fixes the display panel.

6. A display apparatus comprising:
the backlight according to claim 1; and
a display panel disposed to face the backlight, wherein
the display panel comes in contact with the adhesive agent.

7. The backlight according to claim 1, further comprising
a recessed portion provided on an inner side surface of the frame, wherein
the light guide plate and the optical member include a projecting portion that is fitted into the recessed portion and that includes the cutout or the hole.

* * * * *